United States Patent
Spivak et al.

(10) Patent No.: US 10,990,439 B1
(45) Date of Patent: Apr. 27, 2021

(54) TRACING TASK EXECUTION ACROSS SERVICES IN MICROKERNEL-BASED OPERATING SYSTEMS

(71) Applicant: Facebook Technologies, LLC, Menlo Park, CA (US)

(72) Inventors: Vadim Victor Spivak, Redwood City, CA (US); Bernhard Poess, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/584,580

(22) Filed: Sep. 26, 2019

(51) Int. Cl.
| | |
|---|---|
| *G06F 9/44* | (2018.01) |
| *G06F 9/48* | (2006.01) |
| *G06F 11/36* | (2006.01) |
| *G06F 9/54* | (2006.01) |
| *G06F 9/38* | (2018.01) |

(52) U.S. Cl.
CPC .......... *G06F 9/4843* (2013.01); *G06F 9/3836* (2013.01); *G06F 9/544* (2013.01); *G06F 11/3636* (2013.01)

(58) Field of Classification Search
CPC ...... G06F 9/4843; G06F 9/3836; G06F 9/544; G06F 11/3636
USPC .................................................. 717/125–132
See application file for complete search history.

(56) References Cited

U.S. PATENT DOCUMENTS

| | | | | |
|---|---|---|---|---|
| 4,685,125 A | * | 8/1987 | Zave ..................... | G06F 9/4843 700/1 |
| 4,800,521 A | * | 1/1989 | Carter ................... | G06F 9/5055 712/211 |
| 5,379,427 A | * | 1/1995 | Hiroshima .......... | G06F 11/3636 717/124 |
| 5,729,710 A | * | 3/1998 | Magee ................... | G06F 9/544 711/203 |
| 5,771,383 A | * | 6/1998 | Magee ................... | G06F 9/544 718/100 |
| 6,009,270 A | * | 12/1999 | Mann ..................... | G06F 11/348 714/E11.195 |
| 6,243,778 B1 | * | 6/2001 | Fung ................. | H04L 12/40117 370/462 |

(Continued)

OTHER PUBLICATIONS

Zahorjan et al, "Processor Scheduling in Shared Memory Multiprocessors", ACM, pp. 214-225 (Year: 1990).*

(Continued)

*Primary Examiner* — Anil Khatri
(74) *Attorney, Agent, or Firm* — Baker Botts L.L.P.

(57) ABSTRACT

In one embodiment, a method includes allocating a shared memory region accessible by a tracing service and services running in user mode outside of a microkernel of an operating system, in which the shared memory region is used by each service to store entries of execution data from operations executed by the service and each entry of execution data has a task identifier, receiving a query for execution data with a desired task identifier by the tracing service, retrieving a set of entries of execution data from the shared memory region by the tracing service based on the desired task identifier, in which the task identifier of each entry of execution data in the set matches the desired task identifier, and returning the set of entries of execution data by the tracing service.

18 Claims, 4 Drawing Sheets

(56) References Cited

U.S. PATENT DOCUMENTS

| | | | | |
|---|---|---|---|---|
| 7,028,299 | B1* | 4/2006 | Chang | G06F 9/4881 |
| | | | | 707/999.008 |
| 7,134,116 | B1* | 11/2006 | Thekkath | G06F 11/3636 |
| | | | | 717/128 |
| 7,168,066 | B1* | 1/2007 | Thekkath | G06F 11/3636 |
| | | | | 717/127 |
| 8,266,624 | B2* | 9/2012 | Eigler | G06F 9/4843 |
| | | | | 718/103 |
| 8,627,301 | B2* | 1/2014 | Hammer | G06F 9/5066 |
| | | | | 717/158 |
| 8,756,461 | B1* | 6/2014 | Jacob | G06F 11/2097 |
| | | | | 714/45 |
| 8,850,404 | B2* | 9/2014 | Cormack | G06F 11/3409 |
| | | | | 717/131 |
| 8,881,114 | B2* | 11/2014 | Sohm | G06F 11/3648 |
| | | | | 717/128 |
| 10,296,377 | B1* | 5/2019 | Jonsson | G06F 9/4881 |
| 10,331,493 | B2* | 6/2019 | Khojastepour | G06F 9/5083 |
| 10,722,998 | B2* | 7/2020 | Hsu | B24B 37/26 |
| 10,795,739 | B1* | 10/2020 | Klee | G06F 9/546 |

OTHER PUBLICATIONS

Jiang et al, "Optimistic Shared Memory Dependence Tracing", IEEE, pp. 524-534 (Year: 2015).*

Chaimov et al, "Identifying Optimization Opportunities Using Memory Access Tracing in OpenSHMEM Runtimes with the TAU Performance System", IEEE, pp. 749-746 (Year: 2020).*

Wang et al, "Overcoming Hadoop Scaling Limitations through Distributed Task Execution", IEEE, pp. 236-245 (Year: 2015).*

Haugen et al, "Visualizing Execution Traces with Task Dependencies", ACM, pp. 1-8 (Year: 2015).*

Safyallah et al, "Dynamic Analysis of Software Systems using Execution Pattern Mining", IEEE, pp. 1-5 (Year: 2006).*

Bohnet et al, "Visualizing Massively Pruned Execution Traces to Facilitate Trace Exploration", IEEE, pp. 57-64 (Year: 2009).*

Pirzadeh et al, "An Approach for Detecting Execution Phases of a System for the Purpose of Program Comprehension", IEEE, pp. 207-214 (Year: 2010).*

* cited by examiner

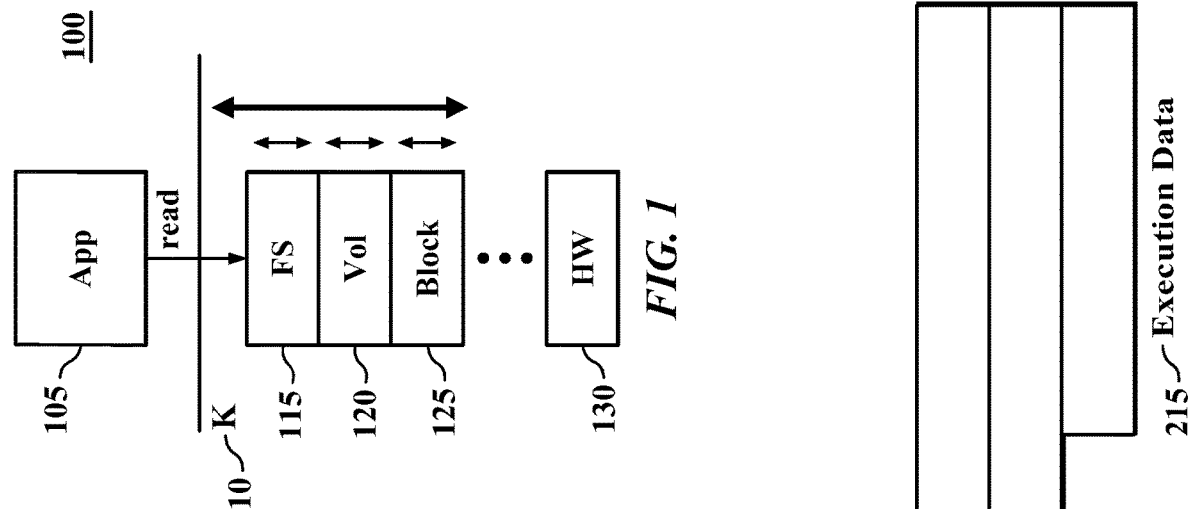
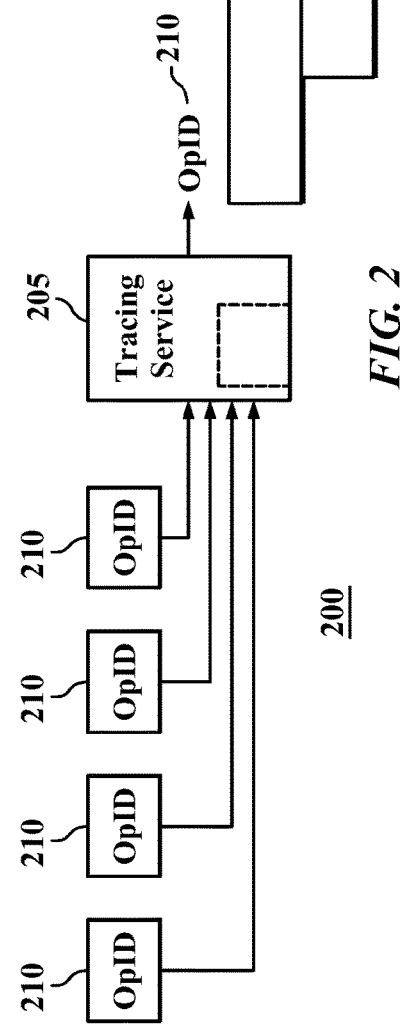
*FIG. 1*
*FIG. 2*

TRACING TASK EXECUTION ACROSS SERVICES IN MICROKERNEL-BASED OPERATING SYSTEMS

TECHNICAL FIELD

This disclosure generally relates to operating systems.

BACKGROUND

An operating system (OS) is system software that manages computer hardware and software resources and provides common services for computer programs. Time-sharing operating systems schedule tasks for efficient use of the system and may also include accounting software for cost allocation of processor time, mass storage, printing, and other resources. For hardware functions such as input and output and memory allocation, the operating system acts as an intermediary between programs and the computer hardware, although the application code is usually executed directly by the hardware and frequently makes system calls to an OS function or is interrupted by it. Operating systems are found on many devices that contain a computer—from cellular phones and video game consoles to web servers and supercomputers.

In computing, a process is the instance of a computer program that is being executed by one or many threads. It contains the program code and its activity. Depending on the operating system (OS), a process may be made up of multiple threads of execution that execute instructions concurrently. While a computer program is a passive collection of instructions, a process is the actual execution of those instructions. Several processes may be associated with the same program; for example, opening up several instances of the same program often results in more than one process being executed. Process management is an integral part of any modern-day operating system (OS). The OS must allocate resources to processes, enable processes to share and exchange information, protect the resources of each process from other processes and enable synchronization among processes. To meet these requirements, the OS must maintain a data structure for each process, which describes the state and resource ownership of that process, and which enables the OS to exert control over each process.

SUMMARY OF PARTICULAR EMBODIMENTS

In particular embodiments, an operating system may use a tracing service for improving performance profiling by tracing operations across different services from the application layer into a microkernel layer of the operating system. The operating system may rely on microkernels to provide services which are essential for executing a task responsive to a user request via an application installed on a computing device. Executing the task may be complex as the operating system may need to perform different operations, such as requesting I/O, networking files, and control over processes, devices, drivers, etc. However, since in a microkernel architecture the various operations are performed by different and isolated services, the operating system may be unable to know the status of each operation, for which the tracing service may be helpful. As an example and not by way of limitation, opening a file and editing it may involve at least five or six different services provided by microkernels. The operating system may first need to locate each service via a service registry, which may provide the handle to the file system host. The file system host may communicate with the device manager to find the location of the block drive. Meanwhile a caching service may cache some relevant data. The aforementioned operations may be all individual services. Hence, for troubleshooting purpose in complex scenarios particularly associated with microkernels, the operating system may need to be able to understand the flows that go from one operation to the next, understand exactly where an operation failed if that happened, and understand the cause when an operation is slow. The tracing service may trace what happens between the application layer and the microkernel layer. Although this disclosure describes particular tracing services via particular systems in particular manners, this disclosure contemplates any suitable tracing service via any suitable system in any suitable manner.

In particular embodiments, a computing device may allocate a shared memory region accessible by a tracing service and one or more services of an operating system. The shared memory region may be configured to be used by each service to store entries of execution data associated with operations executed by the service. Each entry of execution data may be associated with a task identifier. In particular embodiments, the computing device may receive, by the tracing service, a query for execution data associated with a desired task identifier. The computing device may then retrieve, by the tracing service, a set of one or more entries of execution data from the shared memory region based on the desired task identifier. The task identifier of each entry of execution data in the set may match the desired task identifier. In particular embodiments, the computing device may return, by the tracing service, the set of one or more entries of execution data. In particular embodiments, the tracing service and the one or more services may be running in user mode outside of a microkernel of the operating system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1 illustrates an example diagram flow of executing a task.

FIG. 2 illustrates an example diagram flow of tracing operations.

DESCRIPTION OF EXAMPLE EMBODIMENTS

Figure 3:
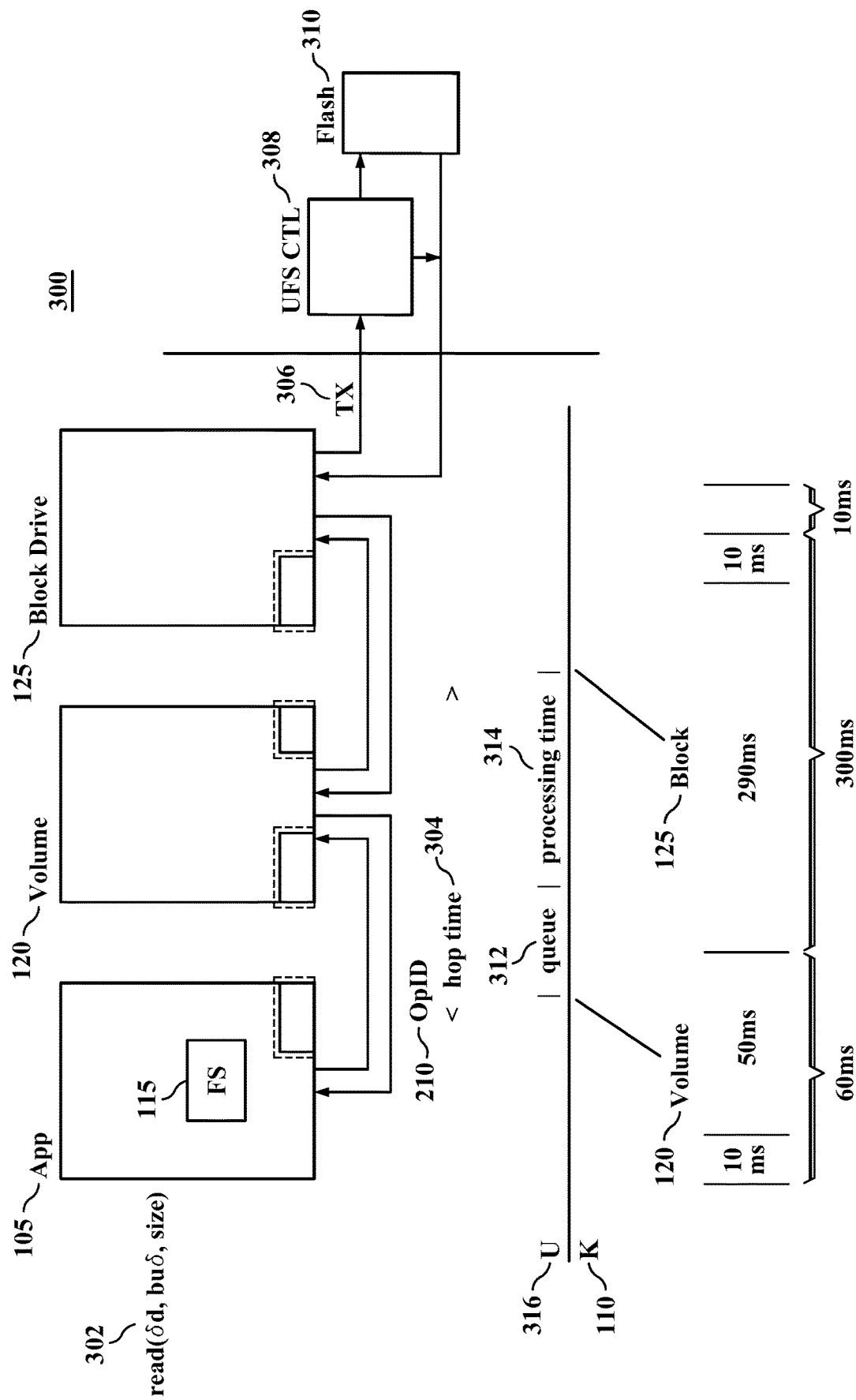
FIG. 3 illustrates example diagram flow of time tracing across different services.

In particular embodiments, an operating system may use a tracing service for improving performance profiling by tracing operations across different services from the application layer into a microkernel layer of the operating system. The operating system may rely on microkernels to provide services which are essential for executing a task responsive to a user request via an application installed on a computing device. Executing the task may be complex as the operating system may need to perform different operations, such as requesting I/O, networking files, and control over processes, devices, drivers, etc. However, since in a microkernel architecture the various operations are performed by different and isolated services, the operating system may be unable to know the status of each operation, for which the tracing service may be helpful. As an example and not by way of limitation, opening a file and editing it may involve at least five or six different services provided by microkernels. The operating system may first need to locate each service via a service registry, which may provide the handle to the file system host. The file system host may communicate with the device manager to find the location of the block drive. Meanwhile a caching service may cache some relevant data. The aforementioned operations may be all individual services. Hence, for troubleshooting purpose in complex scenarios particularly associated with microkernels, the operating system may need to be able to understand the flows that go from one operation to the next, understand exactly where an operation failed if that happened, and understand the cause when an operation is slow. The tracing service may trace what happens between the application layer and the microkernel layer. Although this disclosure describes particular tracing services via particular systems in particular manners, this disclosure contemplates any suitable tracing service via any suitable system in any suitable manner.

In particular embodiments, a computing device may allocate a shared memory region accessible by a tracing service and one or more services of an operating system. The shared memory region may be configured to be used by each service to store entries of execution data associated with operations executed by the service. Each entry of execution data may be associated with a task identifier. In particular embodiments, the computing device may receive, by the tracing service, a query for execution data associated with a desired task identifier. The computing device may then retrieve, by the tracing service, a set of one or more entries of execution data from the shared memory region based on the desired task identifier. The task identifier of each entry of execution data in the set may match the desired task identifier. In particular embodiments, the computing device may return, by the tracing service, the set of one or more entries of execution data. In particular embodiments, the tracing service and the one or more services may be running in user mode outside of a microkernel of the operating system.

FIG. 1 illustrates an example diagram flow 100 of executing a task. In particular embodiments, the desired task identifier may correspond to a first task. Executing the first task may be based on one or more of the one or more services. Each service may be associated with a respective handle. Handles may be used by system calls to reference kernel objects such as processes, threads, sockets, channels or interrupts. In particular embodiments, a handle may have the following attributes including type (job, process, socket, channel, interrupt, etc.), access rights associated with the handle, pointer to kernel object, internal reference count, state flag (free, active, closed, etc.), linked list or bitmap to track handles which are in use by a particular process. As demonstrated in FIG. 1, the operating system may receive a task from an application (App) 105 which is to read some data. The task may be executed by services provided by the microkernel (K) 110. As an example and not by way of limitation, a file system (FS) 115 may respond first and determine if the data is in the file system 115. If not, the file system 115 may communicate with a volume manager (Vol) 120. The volume manager 120 may further communicate with a block drive (Block) 125. The block drive 125 may communicate with the next service and eventually the hardware (HW) 130 may be accessed for such data. The accessed data may be returned by the hardware 130 to the block drive 125. The block drive 125 may return the data to the volume manager 120. The volume manager 120 may return the data to the file system 115. To this end, the file system 115 may return the data to the application 105 to complete the execution of the task. Although this disclosure describes particular diagram flow of task execution via particular systems in particular manners, this disclosure contemplates any suitable diagram flow of task execution via any suitable system in any suitable manner.

In particular embodiments, the operating system may use the tracing service to trace operations associated with a task between different services. As an example and not by way of limitation, an application 105 running on the computing device may need to read data from a file system 115 to a buffer within a given time. The application 105 may send a request to a volume manager 120. The volume manager 120 may communicate with a block drive 120. The block drive 120 may communicate with the hardware 125, after which the data may be returned to the application 105. If reading the data from the file system 115 is slow, the operating system may need to identify the cause by tracing the operations between different services. As an example and not by way of limitation, the operating system may first inquire the file system 115, which may direct the operating system to a quality manager. The quality manager may direct the operating system to another service. The operating system may trace the time spent at each service, which may amount to the total time. On top of that, the operating system may assign each of these operations an operation identifier (ID) and then start tracing them by pushing the operations into the tracing service. A technique used in the tracing service may include a shared memory region to make cross-service tracing efficient. The shared memory region may be shared between the tracing service and other individual services so they can efficiently push operations into the shared memory region, rather than using inter-process communication (IPC) calls to communicate. In particular embodiments, an IPC channel may be a bi-directional, buffered communication channel with two end points referenced through their handles. IPC channels may allow the transfer of a byte message and a set of handles. Initially, an IPC channel may get created locally within a single service process, and hence may be useful for any inter-process communication. By using the tracing service, each service storing entries of execution data associated with operations executed by the service may not require communicating via an inter-process communication (IPC) channel associated with the service. In addition, retrieving the set of one or more entries of execution data from the shared memory region may not require communicating via an inter-process communication (IPC) channel associated with any of the one or more services. Although this disclosure describes tracing particular operations via particular systems in particular manners, this disclosure contemplates tracing any suitable operation via any suitable system in any suitable manner.

FIG. 2 illustrates an example diagram flow 200 of tracing operations. In particular embodiments, a service may perform different operations in response to a task. The tracing service 205 may trace these operations. As an example and not by way of limitation, each operation may be assigned an operation ID (OpID) 210. The operation IDs 210 may be input to the tracing service 205. After that, the tracing service 205 may trace each operation based on its corresponding operation ID 210. As an example and not by way of limitation, entries of execution data 215 associated with operations may be generated according to the operation ID 210, as displayed in FIG. 2. Although this disclosure describes particular operation identifiers in particular manners, this disclosure contemplates any suitable operation identifier in any suitable manner.

FIG. 3 illustrates example diagram flow 300 of time tracing across different services. The tracing service 205 may start functioning once the operating system receives a task. The tracing service 205 may trace the execution from the application (App) 105. As an example and not by way of limitation, the task may be reading data from a file in the file system (FS) 115 to a buffer within a given time, which is demonstrated by the function read(δci, buδ, size) 302 in FIG. 3. In particular embodiments, executing such a task may require multiple services. Each service may comprise one or more operations and each of them may be associated with an operation ID (OpID) 210. Each service may store entries of execution data associated with the operations based on their operation IDs 210 in the shared memory region accessible by both the tracing service 205 and the service. In particular embodiments, each entry of execution data associated with an operation may comprise one or more of a timestamp or an indication of whether the operation is completed. As a result, the tracing service 205 may be able to trace the hop time 304 from one service to another service. FIG. 3 illustrates that the tracing service 205 may trace the execution of the task from the application 105 to the volume manager (Volume) 120. The tracing service 205 may then trace the execution of the task from the volume manager 120 to the block drive 125. The block drive 125 may send a transmission (TX) 306 to a unix file system controller (UFS CTL) 308. If the unix file system controller 308 has the data, it may return the data to the block drive 125. If the unix file system controller 308 does not have the data, it may send the transmission 306 to the flash 310 for fetching the data. The flash 310 may return the data to the block drive 125, which may return the data to the volume manager 120. The volume manager 120 may then return the data to the file system 115. The file system 115 may eventually return the data to the application 105 to complete the task. As indicated in FIG. 3, the execution of the task may result in a hop time 304 associated with each service, e.g., the volume manger 120 and the block drive 12. The hop time 304 associated with each service may be further used to calculate the total time spent to complete the task. As indicated in FIG. 3, the hop time 304 may include both queuing time 312 and processing time 314. The queuing time 312 may indicate that the execution of the task by a service may be put in a queue waiting to be processed by such service. In particular embodiments, the computing device may calculate, for each of the one or more services, a time spent for completing the service based on the set of entries of execution data. As an example and not by way of limitation, there may be a queue at the volume manager 120 with a waiting time of 10 milliseconds (ms). The processing time 314 by the volume manager may be 50 ms. Therefore, the hop time 304 from the volume manager 120 to the block drive 125 is 60 ms. As another example and not by way of limitation, there may be a queue at the block drive 125 with a waiting time of 290 ms. The processing time 314 by the block drive 125 may be 10 ms. Therefore, the hop time 304 from the block drive 125 to the unix file system controller 308 is 300 ms. As another example and not by way of limitation, the hop time 304 from the unix file system controller 308 to the flash 310 may be 10 ms. In particular embodiments, the computing device may further calculate an overall time spent for completing a task corresponding to the desired task identifier based on the time spent for completing each service. As indicated in FIG. 3, the time tracing is at the microkernel level whereas the calculated time may be returned to a user space 316. Although this disclosure describes particular diagram flow of time tracing via particular systems in particular manners, this disclosure contemplates any suitable diagram flow of time tracing via any suitable system in any suitable manner.

In particular embodiments, the computing device may inspect, based on the set of entries of execution data, the one or more services. The inspection may indicate one or more performance issues associated with one or more of the one or more services. Continuing with the example in FIG. 3, the hope time 304 from the block drive 125 to the unix file system controller 308 being 300 ms may indicate that a problem exists at the block drive 125. The tracing service 205 may help the computing device capture such problem. In particular embodiments, the computing device may then adjust, based on the one or more performance issues, the one or more services. Although this disclosure describes inspecting particular issues via particular systems in particular manners, this disclosure contemplates inspecting any suitable issue via any suitable system in any suitable manner.

Besides enabling the operating system to adjust each operation based on an accurate read on the timestamp and all the queueing time 312 and processing time 314, the tracing service 205 may provide other technical advantages to the operating system. In particular embodiments, executing the first task may comprise transferring a handle associated with a service to another service. The computing device may further store, in an entry of execution data in the shared memory region, the transfer of the handle. The stored transfer of the handle may be associated with the desired task identifier. In particular embodiments, the set of entries of execution data may comprise the transfer of the handle. Therefore, the tracing service 205 may additionally help the operating system track how handles are passed across services, thereby providing a way to disambiguate or identify handles as they are passed through different services. Although this disclosure describes transferring particular handles via particular systems in particular manners, this disclosure contemplates transferring any suitable handle via any suitable system in any suitable manner.

Figure 4:
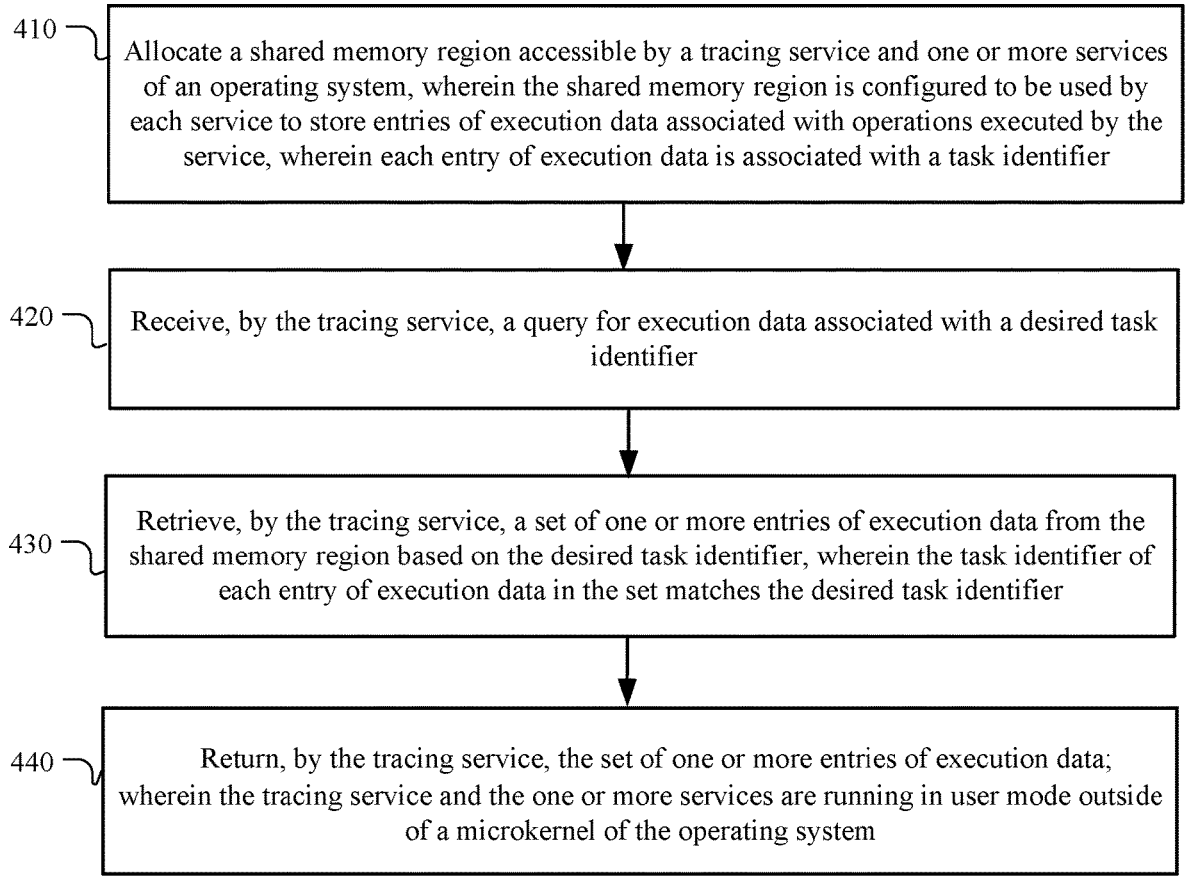
FIG. 4 illustrates an example method for tracing the execution of a task.

FIG. 4 illustrates an example method 400 for tracing the execution of a task. The method may begin at step 410, where the computing device may allocate a shared memory region accessible by a tracing service 205 and one or more services of an operating system, wherein the shared memory region is configured to be used by each service to store entries of execution data associated with operations executed by the service, wherein each entry of execution data is associated with a task identifier. At step 420, the computing device may receive, by the tracing service 205, a query for execution data associated with a desired task identifier. At step 430, the computing device may retrieve, by the tracing service 205, a set of one or more entries of execution data from the shared memory region based on the desired task identifier, wherein the task identifier of each entry of execution data in the set matches the desired task identifier. At step 440, the computing device may return, by the tracing service 205, the set of one or more entries of execution data, wherein the tracing service 205 and the one or more services may be running in user mode outside of a microkernel of the operating system. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for tracing the execution of a task including the particular steps of the method of FIG. 4, this disclosure contemplates any suitable method for tracing the execution of a task including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
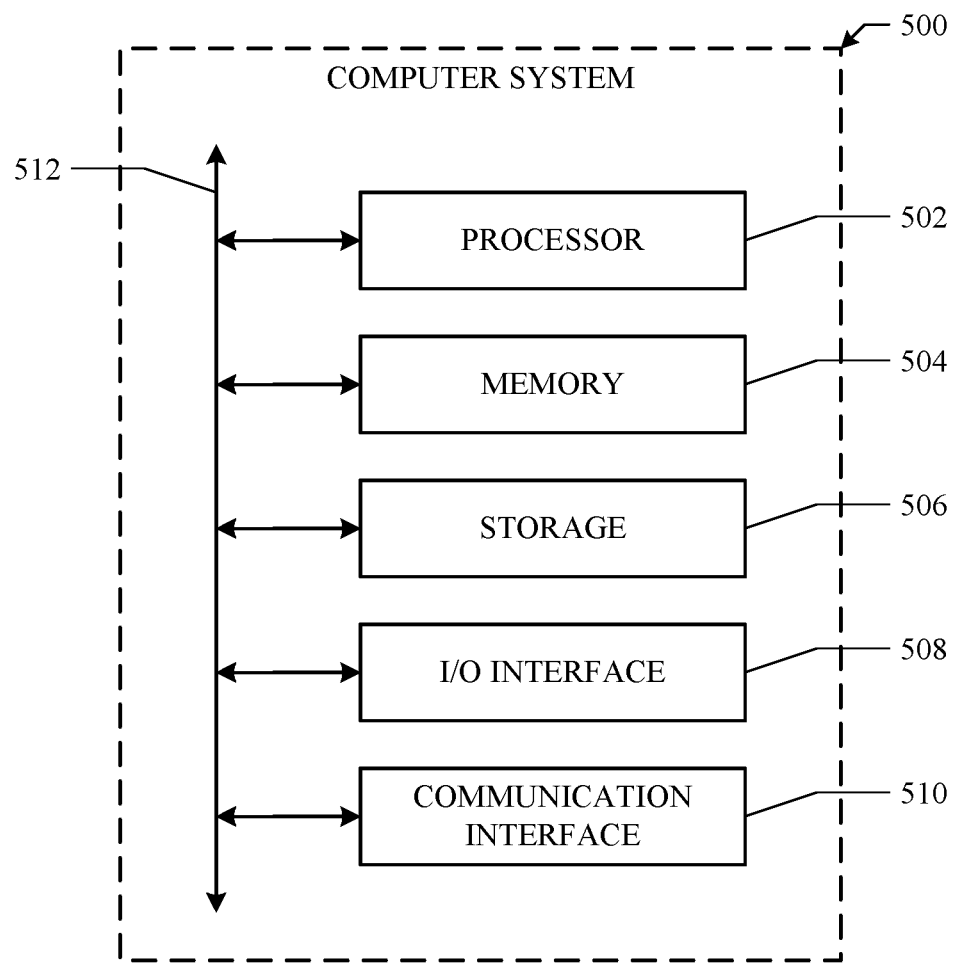
FIG. 5 illustrates an example computer system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
    allocating a shared memory region accessible by a tracing service and one or more services of an operating system, wherein the shared memory region is configured to be used by each service to store entries of execution data associated with operations executed by the service;
    executing one or more tasks by one or more of the services to generate a plurality of entries of execution data in the shared memory region,
    wherein each of the plurality of entries of execution data (1) is associated with a task identifier corresponding to one of the one or more tasks and (2) comprises one or more of a timestamp or information associated with an executed operation associated with that task;
    receiving, by the tracing service, a query for execution data associated with a desired task identifier;
    retrieving, by the tracing service, a set of one or more entries of execution data from the shared memory region based on the desired task identifier,
    wherein the task identifier of each entry of execution data in the set matches the desired task identifier; and
    returning, by the tracing service, the set of one or more entries of execution data;
    wherein the tracing service and the one or more services are running in user mode outside of a microkernel of the operating system.

2. The method of claim 1, wherein each service storing entries of execution data associated with operations executed by the service does not require communicating via an inter-process communication (IPC) channel associated with the service.

3. The method of claim 1, wherein retrieving the set of one or more entries of execution data from the shared memory region does not require communicating via an inter-process communication (IPC) channel associated with any of the one or more services.

4. The method of claim 1, wherein the desired task identifier corresponds to a first task, wherein executing the first task is based on one or more of the one or more services, and wherein each service is associated with a respective handle.

5. The method of claim 4, wherein executing the first task comprises:
    transferring a handle associated with a service to another service.

6. The method of claim 5, further comprising:
storing, in an entry of execution data in the shared memory region, the transfer of the handle, wherein the stored transfer of the handle is associated with the desired task identifier.

7. The method of claim 6, wherein the set of entries of execution data comprises the transfer of the handle.

8. The method of claim 1, further comprises:
calculating, for each of the one or more services, a time spent for completing the service based on the set of entries of execution data; and
calculating an overall time spent for completing a task corresponding to the desired task identifier based on the time spent for completing each service.

9. The method of claim 1, further comprising:
inspecting, based on the set of entries of execution data, the one or more services, wherein the inspection indicates one or more performance issues associated with one or more of the one or more services; and
adjusting, based on the one or more performance issues, the one or more services.

10. One or more computer-readable non-transitory storage media embodying software that is operable when executed to:
allocate a shared memory region accessible by a tracing service and one or more services of an operating system, wherein the shared memory region is configured to be used by each service to store entries of execution data associated with operations executed by the service;
execute one or more tasks by one or more of the services to generate a plurality of entries of execution data in the shared memory region,
wherein each of the plurality of entries of execution data (1) is associated with a task identifier corresponding to one of the one or more tasks and (2) comprises one or more of a timestamp or information associated with an executed operation associated with that task;
receive, by the tracing service, a query for execution data associated with a desired task identifier;
retrieve, by the tracing service, a set of one or more entries of execution data from the shared memory region based on the desired task identifier,
wherein the task identifier of each entry of execution data in the set matches the desired task identifier; and
return, by the tracing service, the set of one or more entries of execution data;
wherein the tracing service and the one or more services are running in user mode outside of a microkernel of the operating system.

11. The media of claim 10, wherein each service storing entries of execution data associated with operations executed by the service does not require communicating via an inter-process communication (IPC) channel associated with the service.

12. The media of claim 10, wherein retrieving the set of one or more entries of execution data from the shared memory region does not require communicating via an inter-process communication (IPC) channel associated with any of the one or more services.

13. The media of claim 10, wherein the desired task identifier corresponds to a first task, wherein executing the first task is based on one or more of the one or more services, and wherein each service is associated with a respective handle.

14. The media of claim 13, wherein executing the first task comprises:
transferring a handle associated with a service to another service.

15. The media of claim 14, wherein the software is further operable when executed to:
store, in an entry of execution data in the shared memory region, the transfer of the handle, wherein the stored transfer of the handle is associated with the desired task identifier.

16. The media of claim 15, wherein the set of entries of execution data comprises the transfer of the handle.

17. The media of claim 10, wherein the software is further operable when executed to:
calculate, for each of the one or more services, a time spent for completing the service based on the set of entries of execution data; and
calculate an overall time spent for completing a task corresponding to the desired task identifier based on the time spent for completing each service.

18. A system comprising: one or more processors; and a non-transitory memory coupled to the processors comprising instructions executable by the processors, the processors operable when executing the instructions to:
allocate a shared memory region accessible by a tracing service and one or more services of an operating system, wherein the shared memory region is configured to be used by each service to store entries of execution data associated with operations executed by the service;
execute one or more tasks by one or more of the services to generate a plurality of entries of execution data in the shared memory region,
wherein each of the plurality of entries of execution data (1) is associated with a task identifier corresponding to one of the one or more tasks and (2) comprises one or more of a timestamp or information associated with an executed operation associated with that task;
receive, by the tracing service, a query for execution data associated with a desired task identifier;
retrieve, by the tracing service, a set of one or more entries of execution data from the shared memory region based on the desired task identifier,
wherein the task identifier of each entry of execution data in the set matches the desired task identifier; and
return, by the tracing service, the set of one or more entries of execution data;
wherein the tracing service and the one or more services are running in user mode outside of a microkernel of the operating system.

* * * * *